(12) United States Patent
Hirose (10) Patent No.: US 10,077,202 B2
(45) Date of Patent: Sep. 18, 2018

(54) METHOD FOR MANUFACTURING OPTICAL ELEMENT

(71) Applicant: OLYMPUS CORPORATION, Hachioji-shi, Tokyo (JP)

(72) Inventor: Ikunori Hirose, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 117 days.

(21) Appl. No.: 15/372,340

(22) Filed: Dec. 7, 2016

(65) Prior Publication Data

US 2017/0081234 A1    Mar. 23, 2017

Related U.S. Application Data

(63) Continuation of application No. PCT/JP2015/066143, filed on Jun. 4, 2015.

(30) Foreign Application Priority Data

Jul. 18, 2014    (JP) .................. 2014-148056

(51) Int. Cl.
*C03B 11/12*    (2006.01)
*G02B 3/00*    (2006.01)
(Continued)

(52) U.S. Cl.
CPC .......... *C03B 11/125* (2013.01); *C03B 11/08* (2013.01); *G02B 3/00* (2013.01); *B29C 43/021* (2013.01); *B29C 43/58* (2013.01); *B29C 2043/3628* (2013.01); *B29C 2043/5816* (2013.01); *B29C 2043/5833* (2013.01);
(Continued)

(58) Field of Classification Search
CPC .......... B29C 43/021; B29C 2043/5833; C03B 11/125
See application file for complete search history.

(56) References Cited

FOREIGN PATENT DOCUMENTS

JP    62176930 A    8/1987
JP    06345456 A    12/1994
(Continued)

OTHER PUBLICATIONS

International Search Report (ISR) and Written Opinion dated Aug. 18, 2015 issued in International Application No. PCT/JP2015/066143.
Chinese Office Action (and English language translation thereof) dated May 28, 2018 issued in counterpart Chinese Application No. 201580031826.7.

*Primary Examiner* — James Sanders
(74) *Attorney, Agent, or Firm* — Holtz, Holtz & Volek PC (57) ABSTRACT

A method for manufacturing an optical element includes heating an optical material up to a first temperature that is higher than a transition point, pressurizing the optical material using a first mold and a second mold that are situated opposite to each other across the optical material, first cooling the optical material down to a second temperature that is higher than a strain point and lower than the first temperature while pressurizing the optical material with a predetermined load using the first mold and the second mold, releasing the predetermined load at a set speed that is higher than or equal to a speed obtained in advance, at which an elastic deformation occurs preferentially over a viscous deformation in the optical material upon releasing a load, and second cooling the optical material down to a third temperature that is lower than the second temperature.

7 Claims, 6 Drawing Sheets

(51) Int. Cl.
*C03B 11/08* (2006.01)
*B29L 11/00* (2006.01)
*B29D 11/00* (2006.01)
*B29C 43/02* (2006.01)
*B29C 43/58* (2006.01)
*B29C 43/36* (2006.01)

(52) U.S. Cl.
CPC .......... *B29C 2043/5866* (2013.01); *B29D 11/00009* (2013.01); *B29D 11/00451* (2013.01); *B29L 2011/0016* (2013.01); *C03B 2215/46* (2013.01); *C03B 2215/69* (2013.01); *C03B 2215/72* (2013.01); *C03B 2215/86* (2013.01)

(56) References Cited

FOREIGN PATENT DOCUMENTS

| | | |
|---|---|---|
| JP | 2006096611 A | 4/2006 |
| JP | 2009023101 A | 2/2009 |
| JP | 2011256078 A | 12/2011 |
| JP | 2012201518 A | 10/2012 |

| CONDITION | AVERAGE SPEED OF MOVING-UP OF AXIS AFTER 0.2 SECONDS SINCE MOVING-UP WAS STARTED [mm/sec] | TIME NEEDED TO RELEASE APPLIED PRESSURE [sec] | DEMOLDING SUCCESS RATE |
|---|---|---|---|
| CONDITION 1 | 15 | 0.28 | 0% |
| CONDITION 2 | 30 | 0.15 | 44% |
| CONDITION 3 | 90 | 0.11 | 100% |

METHOD FOR MANUFACTURING OPTICAL ELEMENT

CROSS REFERENCE TO RELATED APPLICATIONS

This is Continuation application of PCT application No. PCT/JP/2015/066143, filed Jun. 4, 2015, which was not published under PCT Article 21(2) in English.

This application is based upon and claims the benefit of priority from the prior Japanese Patent Application No. 2014-148056, filed Jul. 18, 2014, the entire contents of which are incorporated herein by reference.

BACKGROUND OF THE INVENTION

Field of the Invention

The present invention relates to a method for manufacturing an optical element.

Description of the Related Art

Conventionally, a method for manufacturing an optical element is known, the method including pressurizing an optical element in a heated and softened state and cooling it.

In the above-described method for manufacturing an optical element, a scheme is known that performs one or more pressure changes in a cooling step so as to prevent a problem such as cracking or breaking from occurring or to prevent the surface accuracy from being reduced upon demolding, the pressure change continuously applying and reducing a pressure applied to an optical element (see, for example, Japanese Laid-open Patent Publication No. 2012-201518).

SUMMARY OF THE INVENTION

A method for manufacturing an optical element according to an aspect of the present invention includes heating an optical material up to a first temperature that is higher than a transition point, pressurizing the optical material using a first mold and a second mold that are situated opposite to each other across the optical material, first cooling the optical material down to a second temperature that is higher than a strain point and lower than the first temperature while pressurizing the optical material with a predetermined load using the first mold and the second mold, releasing the predetermined load at a set speed that is higher than or equal to a speed obtained in advance, at which an elastic deformation occurs preferentially over a viscous deformation in the optical material upon releasing a load, and second cooling the optical material down to a third temperature that is lower than the second temperature.

A method for manufacturing an optical element according to another aspect of the present invention includes heating an optical material up to a first temperature that is higher than a transition point, pressurizing the optical material using a first mold and a second mold that are situated opposite to each other across the optical material, first cooling the optical material down to a second temperature that is higher than a strain point and lower than the first temperature while pressurizing the optical material with a predetermined load using the first mold and the second mold, releasing the predetermined load at a set speed that is lower than or equal to a speed obtained in advance, at which a viscous deformation occurs preferentially over an elastic deformation in the optical material upon releasing a load, and second cooling the optical material down to a third temperature that is lower than the second temperature.

DETAILED DESCRIPTION OF INVENTION

There has been a possibility that demolding will not sufficiently be facilitated even if a pressure applied to an optical element is continuously applied and reduced in the cooling step as described above.

When an optical element that has been accommodated in a die set is sequentially provided in stages in which steps such as heating, pressurizing, cooling, and demolding are performed respectively and a pressure applied to the optical element is released in each of the stages, a form-transfer from molds of the die set to the optical material is not sufficiently performed due to, for example, the optical element being demolded at an unintended point in the cooling step, which may result in a reduction of the surface accuracy of the optical element.

A method for manufacturing an optical element according to embodiments of the present invention will now be described with reference to the drawings.

First Embodiment

Figure 1:
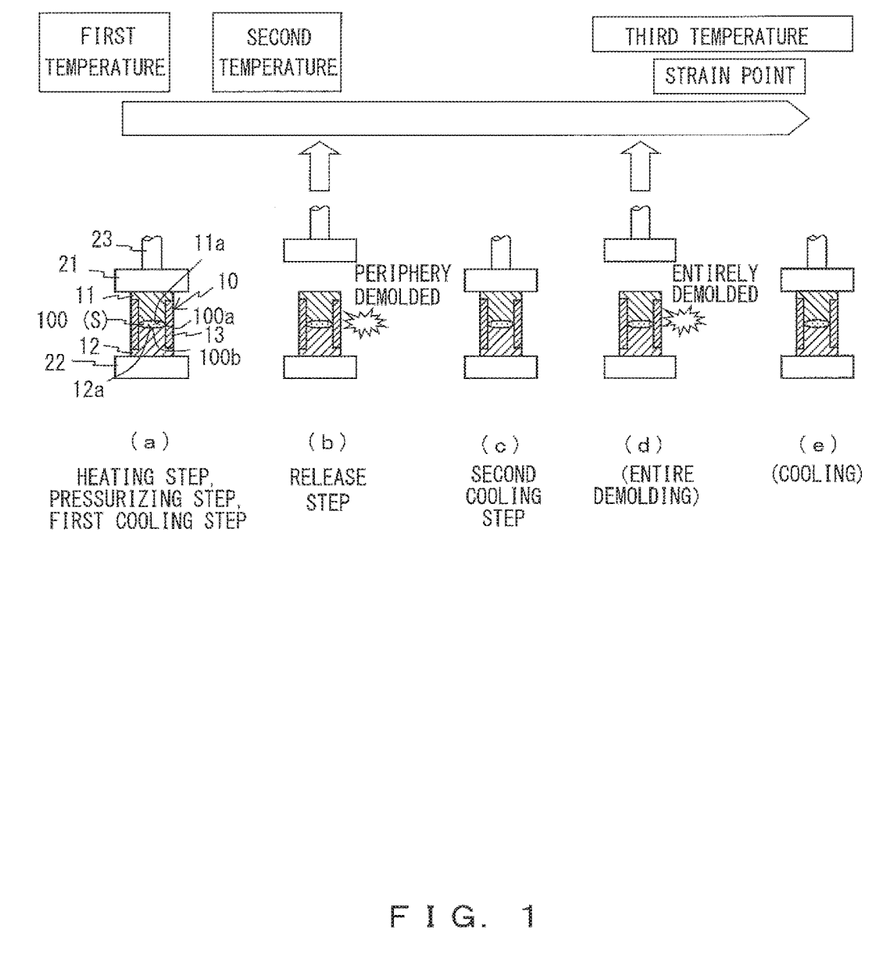
FIG. 1 is a diagram for explaining a method for manufacturing an optical element according to a first embodiment of the present invention.

FIG. 1 is a diagram for explaining a method for manufacturing an optical element according to a first embodiment of the present invention.

A die set 10 illustrated in FIG. 1 includes an upper die 11 and a lower die 12 that are situated opposite to each other across an optical material 100, and a cylindrical body die 13 arranged around these upper die 11 and lower die 12. The upper die 11 and the lower die 12 are examples of a first mold and a second mold. The optical material 100 is, for example, glass, and an optical element manufactured through each step described later is, for example, a glass lens.

A concave molding surface 11a is formed on the bottom surface of the upper die 11. A concave molding surface 12a is formed on the top surface of the lower die 12. Thus, in the first embodiment, a biconvex optical element is manufactured. However, an optical element according to the first embodiment may have another shape having a thickest portion 100b that is a portion other than a periphery 100a, such as a convex shape on one side.

A first contact member 21 is arranged so as to come into contact with the top surface of the upper die 11. A second contact member 22 is arranged so as to come into contact with the bottom surface of the lower die 12. The first contact member 21 is coupled to a pressurizing axis 23 and is moved up and down by driving the pressurizing axis 23.

For example, the first contact member 21 and the second contact member 22 each have a heater (not illustrated), and heat or cool the upper die 11 and the lower die 12 and therefore the molded material 100 by thermal conduction. Thus, the first contact member 21 and the second contact member 22 serve as a heating device or a cooling device. Each of the first contact member 21 and the second contact member 22 may be a member for thermal conduction that is arranged between a member having a heater and the die set 10.

The pressurizing axis 23 moves up and down the first contact member 21 so as to serve as a pressurizing device that applies a pressure to the optical material 100 or as a release device that releases a pressure applied to the optical material 100.

For example, the first contact member 21, the second contact member 22, and the pressurizing axis 23 constitute a stage that is arranged in a molding chamber. One or more stages are arranged in the molding chamber. When the number of stages is one, the upper die 11 may be fixed on the first contact member 21 and the lower die 12 may be fixed on the second contact member 22, so as to provide the optical material 100 between the upper die 11 and the lower die 12.

The method for manufacturing an optical element according to the first embodiment is described below.

As indicated in (a) of FIG. 1, the optical material 100 accommodated in the die set 10 is heated by, for example, thermal conduction by the first contact member 21 and the second contact member 22 through the upper die 11 and the lower die 12 up to a first temperature that is higher than a transition point, so as to be softened (a heating step).

Next, the first contact member 21 is moved down by the pressurizing axis 23 so that the optical material 100 is pressurized by the upper die 11 and the lower die 12 (a pressurizing step). The heating step and the pressurizing step may be performed at different stages (the first contact member 21, the second contact member 22, and the pressurizing axis 23) from each other, or at one stage. Likewise, other steps that will be described later may be performed at different stages, or two or more steps from among the other steps may be performed at one stage. However, a first cooling step and a demolding step that will be described later are preferably performed at one stage.

Next, the optical material 100 is cooled down to a second temperature that is higher than a strain point and lower than the above-described first temperature while being pressurized by the upper die 11 and the lower die 12 with a predetermined load (the first cooling step).

Next, as indicated in (b) of FIG. 1, the pressurizing axis 23 moves up the first contact member 21 so as to release the predetermined load with which the optical material 100 is pressurized in the above-described first cooling step (a release step). In this release step, the predetermined load is released at a set speed that is higher than or equal to a speed obtained in advance, at which an elastic deformation occurs preferentially over a viscous deformation in the optical material 100 upon releasing a load. This results in demolding at least a portion of the periphery 100a of the optical material 100 (for example, only a portion or the entirety of the periphery 100a) from at least one of the upper die 11 and the lower die 12. The periphery 100a of the optical material 100 is situated farther outward than an effective diameter of the optical element that is a portion exhibiting optical properties (an optically functional surface). The release step will be described in detail later.

Next, as indicated in (c) of FIG. 1, the pressurizing axis 23 moves down the first contact member 21 to bring it into contact with the upper surface of the upper die 11, and in the contacting state, the optical material 100 is cooled down to a third temperature that is lower than the above-described second temperature (a second cooling step). The third temperature may be higher than or equal to the strain point, or lower than the strain point.

Next, as indicated in (d) of FIG. 1, the pressurizing axis 23 moves up the first contact member 21 so that, for example, the entirety of the optical material 100 is demolded from the upper die 11 and the lower die 12. Here, it is sufficient if the speed at which the pressurizing axis 23 moves up the first contact member 21 is lower than the set speed described above.

Next, as indicated in (e) of FIG. 1, the pressurizing axis 23 may move down the first contact member 21 to bring it into contact with the upper die 11 so that the optical material 100 is further cooled in the contacting state but without applying a load.

After that, a manufactured optical element is taken out from the die set 10.

Here, the above release step is described.

Figure 2:
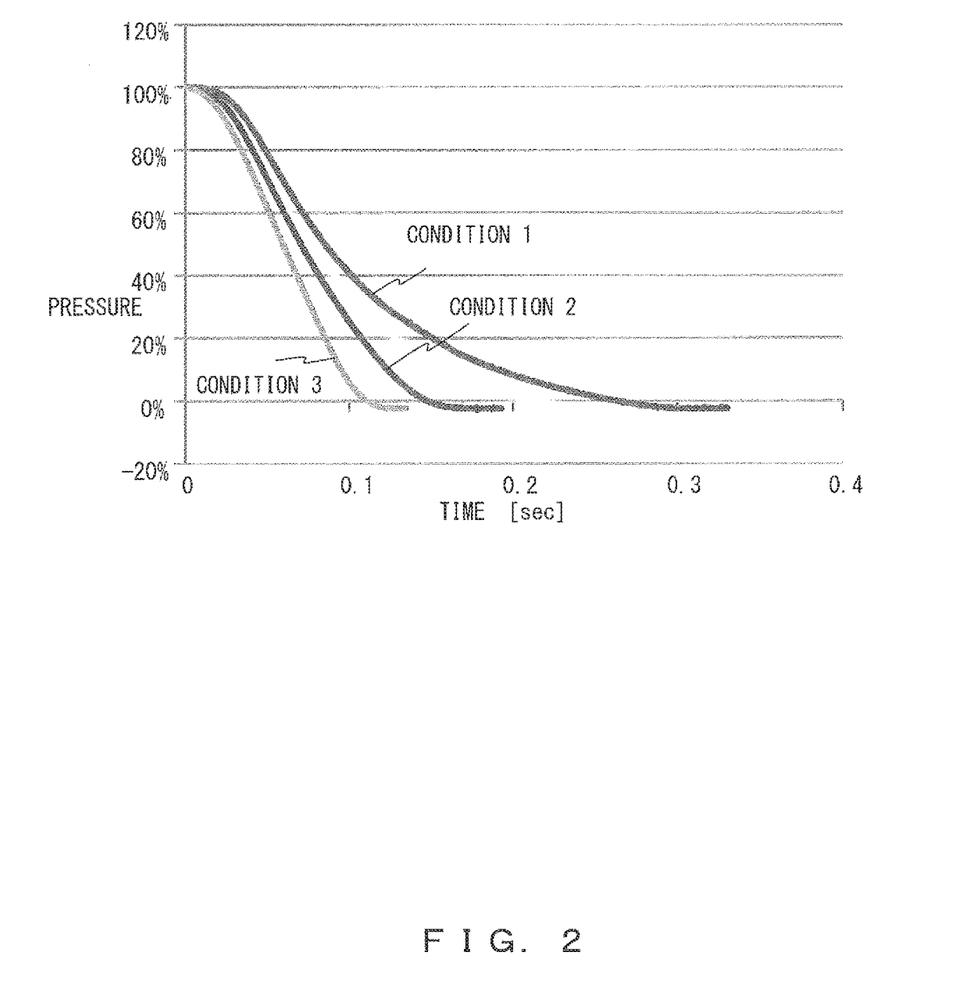
FIG. 2 is a graph that illustrates a relationship between an applied pressure and a time needed to release the applied pressure under each condition.

FIG. 2 is a graph that illustrates a relationship between an applied pressure and a time needed to release the applied pressure under each condition.

Figure 3:
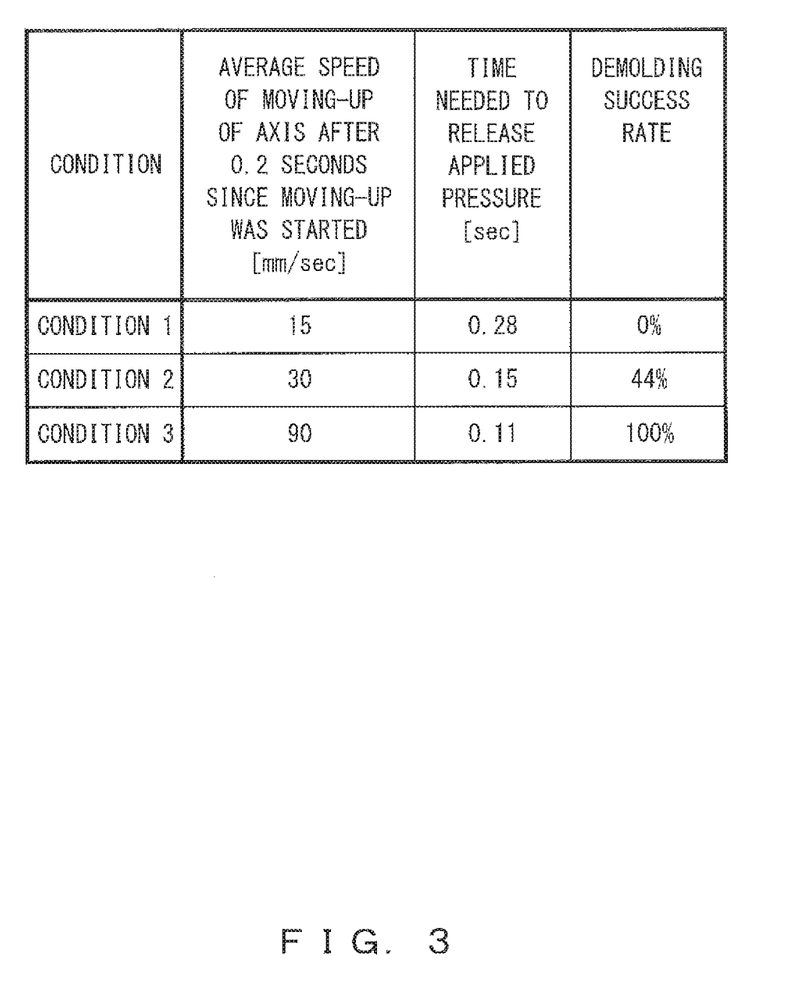
FIG. 3 is a table that illustrates a demolding success rate under each of the conditions.

FIG. 3 is a table that illustrates a demolding success rate under each of the conditions.

As illustrated in FIG. 3, the speed at which the pressurizing axis 23 moves up the first contact member 21 after 0.2 seconds since the moving-up was started is 15 [mm/sec] under condition 1, 30 [mm/sec] under condition 2, and 90 [mm/sec] under condition 3.

As illustrated in FIGS. 2 and 3, the time needed to release a pressure applied to the optical material 100 is 0.28 [sec] under condition 1, 0.15 [sec] under condition 2, and 0.11 [sec] under condition 3.

As illustrated in FIG. 3, the success rate of demolding the periphery 100a of the optical material 100 in the release step of (b) in FIG. 1 is 0 [%] under condition 1, 44 [%] under condition 2, and 100 [%] under condition 3.

In the first embodiment, the set speed in the release step of (b) in FIG. 1 is the speed under condition 3. As a result, an elastic deformation occurs preferentially over a viscous deformation in the optical material 100 upon releasing a load so as to perform demolding, which will be described later. Here, the speed at which the demolding success rate is greater than or equal to 90% is an example of the speed obtained in advance at which an elastic deformation occurs preferentially over a viscous deformation, and a speed that is higher than or equal to the above-described speed obtained in advance, such as the speed at which the demolding success rate is 100% (90 [mm/sec]) under condition 3 in FIGS. 2 and 3, can be used as the above-described set speed.

When a molding space S illustrated in FIG. 1 that is formed by the upper die 11 and the lower die 12 may mold the optical material 100 (optical element) having the thickest portion 100b which has a thickness greater than or equal to 5.9 times the thickness of the periphery 100a, it is preferable that, in the release step, the predetermined load be released at a speed at which the release is completed within 0.11 seconds, in order to increase a repulsive force described later so as to facilitate demolding.

Further, it is preferable that, in the release step, the above-described predetermined load just before the release at a set speed be greater than or equal to 24 [N/mm$^2$], in order to increase a repulsive force described later so as to facilitate demolding.

Furthermore, it is preferable that, in the release step, a central axis of the upper die 11 be inclined with respect to a central axis of the lower die 12 by an angle between 0.7 to 1.5 arc minutes by, for example, inclining the pressurizing axis 23, in order to facilitate demolding.

Figure 4A:
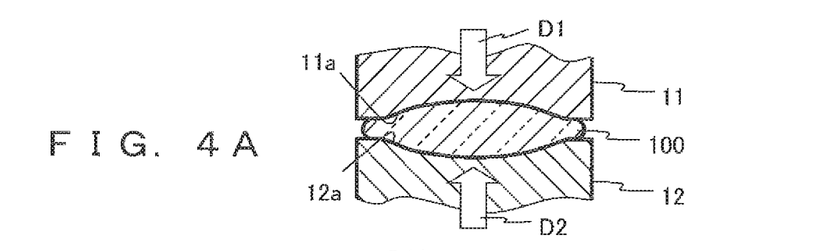
FIG. 4A is a diagram for explaining demolding of an optical material (Part 1)
Figure 4B:
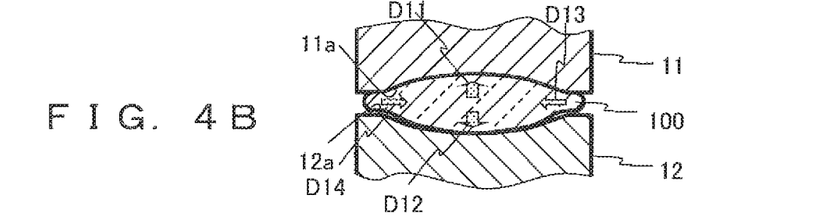
FIG. 4B is a diagram for explaining demolding of the optical material (Part 2)
Figure 4C:
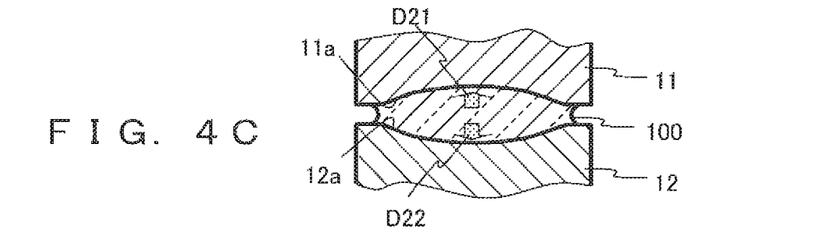
FIG. 4C is a diagram for explaining demolding of the optical material (Part 3)

FIGS. 4A to 4C are diagrams for explaining demolding of the optical material 100.

The shapes of the molding surfaces 11a and 12a of the upper die 11 and the lower die 12 of FIGS. 4A to 4C are slightly different from those of FIG. 1, but they are similar in being concave.

As illustrated in FIG. 4A, the optical material 100 having a convex shape (for example, a biconvex shape) is contracted in the cooling step such that its surfaces each have less curvature. Then, if the contractile force of the optical material 100 exceeds the adhesion force to the upper die 11 and the lower die 12 and the surfaces of the optical material 100 have less curvature than the molding surfaces 11a and 12a of the upper die 11 and the lower die 12, the optical material 100 will be demolded. In FIG. 4A, arrows D1 and D2 indicate the forces to which the optical material 100 is subject from the upper die 11 and the lower die 12, respectively.

When the optical material 100 exists in an area in which it flows in a viscous manner, the adhesion of the optical material 100 to the molding surfaces 11a and 12a is maintained due to an application of pressure, so even if it is cooled to become more elastic, it will be possible to prevent the surfaces of the optical material 100 from having less curvature than the molding surfaces 11a and 12a due to the elastic deformation as long as a high pressure is applied.

If the pressure is suddenly eliminated at a high pressure, the elastic strain of the optical material 100 will be released at once, and the optical material 100 will be deformed in a shrinking direction (arrows D11 to D14) as illustrated in FIG. 4B so as to be demolded. In this case, the optical material 100 will be repulsively deformed in a state in which its volume remains unchanged, such that a space between the upper die 11 and the lower die 12 is broadened and such that its surfaces have less curvature. As described above, in order for the optical material 100 to be demolded, the contractile force of the optical material 100 has to exceed the adhesion force to the upper die 11 and the lower die 12.

Here, the optical material 100 is also viscous, so it can flow in a viscous manner (can be deformed) if the pressure is released slowly. Thus, when the pressure is released slowly, a repulsive deformation that broadens a space between the upper die 11 and the lower die 12 without demolding (arrows D21 and D22) occurs due to viscous flowing, as illustrated in FIG. 4C, with the result that demolding will not be performed. The reason is that the optical material 100 flows in a viscous manner such that the diameter of a free surface of the periphery is reduced, so as to maintain its volume unchanged without having to be deformed (demolded) such that its surfaces have less curvature.

Next, the reason that, with respect to the optical material 100 of the first embodiment which has the thickest portion 100b at a different portion than the periphery 100a, the periphery 100a is to be demolded in the release step of (b) in FIG. 1 is described.

The thickest portion 100b is largely contracted if the optical material 100 is pressurized and its temperature is cooled without it being demolded, so when the pressure is released, its surfaces have less curvature so that a repulsive force that broadens a space between the upper die 11 and the lower die 12 does not occur. Thus, the optical material 100 is gradually not demolded if its temperature is cooled without it being demolded.

Therefore, a strain is released while the repulsive force in the thickest portion 100b still occurs, by eliminating the pressure suddenly at a high pressure, releasing the elastic strain of the optical material 100 at once, and demolding the optical material 100, and then a repulsive force is newly caused to occur by reapplying a pressure, which results in being able to cool it down to a low temperature (for example, to a strain point) in a state in which the repulsive force of the thickest portion 100b is maintained.

Specifically, if the optical material 100 has a biconvex shape having a flat portion on the upper surface or the bottom surface of the periphery 100a that is a start point of demolding, a natural contraction effect that permits the surfaces of the optical material 100 to have less curvature than the molding surfaces 11a and 12a of the upper die 11 and the lower die 12 is not obtained in the flat portion, which results in difficulty in demolding.

In the first embodiment described above, the method for manufacturing an optical element includes the heating step, the pressurizing step, the first cooling step, the release step, and the second cooling step. In the heating step, the optical material 100 is heated up to a first temperature that is higher than a transition point. In the pressurizing step, the optical material 100 is pressurized by the upper die 11 and the lower die 12 (examples of the first mold and the second mold) that are situated opposite to each other across the optical material 100. In the first cooling step, the optical material 100 is cooled down to a second temperature that is higher than a strain point and lower than the first temperature while being pressurized by the upper die 11 and the lower die 12 with a predetermined load. In the release step, the above-described predetermined load is released at a set speed that is higher than or equal to a speed obtained in advance, at which an elastic deformation occurs preferentially over a viscous deformation in the optical material 100 upon releasing a load. The optical material 100 is cooled down to a third temperature that is lower than the second temperature.

Thus, in the release step, the elastic strain of the optical material 100 is released at once, the optical material 100 is deformed in a shrinking direction (arrows D11 to D14) as illustrated in FIG. 4B, and the contractile force of the optical material 100 has to exceed the adhesion force to the upper die 11 and the lower die 12, so that the optical material 100 is demolded, for example, in the periphery 100a.

Thus, the first embodiment makes it possible to control a demolding state of the optical material 100 so as to facilitate demolding of the optical material 100 easily.

Further, in the first embodiment, the above-described predetermined load is released so as to demold at least a portion of the periphery 100a of the optical material 100 from at least one of the upper die 11 and the lower die 12. Thus, if the optical material 100 is demolded in the periphery 100a, it is possible to easily demold the entirety of the optical material 100 from the upper die 11 and the lower die 12 even if it is cooled down to a low temperature in a state in which the repulsive force of the thickest portion 100b is maintained. Thus, it is possible to further facilitate demolding of the optical material 100.

Furthermore, in the first embodiment, the molding space S formed by the upper die 11 and the lower die 12 may mold the optical material 100 (optical element) having the thickest portion 100b which has a thickness greater than or equal to 5.9 times the thickness of the periphery 100a, and in the release step, the above-described predetermined load is released at a speed at which the release is completed within 0.11 seconds. This permits the elastic strain of the optical material 100 to be released at once, so as to further facilitate demolding of the optical material 100.

Moreover, in the first embodiment, in the release step, the predetermined load just before the release is greater than or equal to 24 [N/mm$^2$]. This makes it possible to release a pressure on the optical material 100 in a state in which the repulsive force of the optical material 100 has been increased. Thus, it is possible to further facilitate demolding of the optical material 100.

Further, in the first embodiment, when the central axis of the upper die 11 is inclined with respect to the central axis of the lower die 12 by an angle between 0.7 to 1.5 arc minutes in the release step, it is possible to enhance the demolding operation in the periphery 100a of the optical material 100. Thus, it is possible to further facilitate demolding of the optical material 100.

Second Embodiment

In a second embodiment of the present invention, an example in which not only the periphery 100a of the optical material 100 but also the entirety of the optical material 100 is demolded in the release step is described. Further, in the second embodiment, the descriptions of matters that overlap those of the first embodiment are omitted as appropriate, and the descriptions are focused on different matters.

Figure 5:
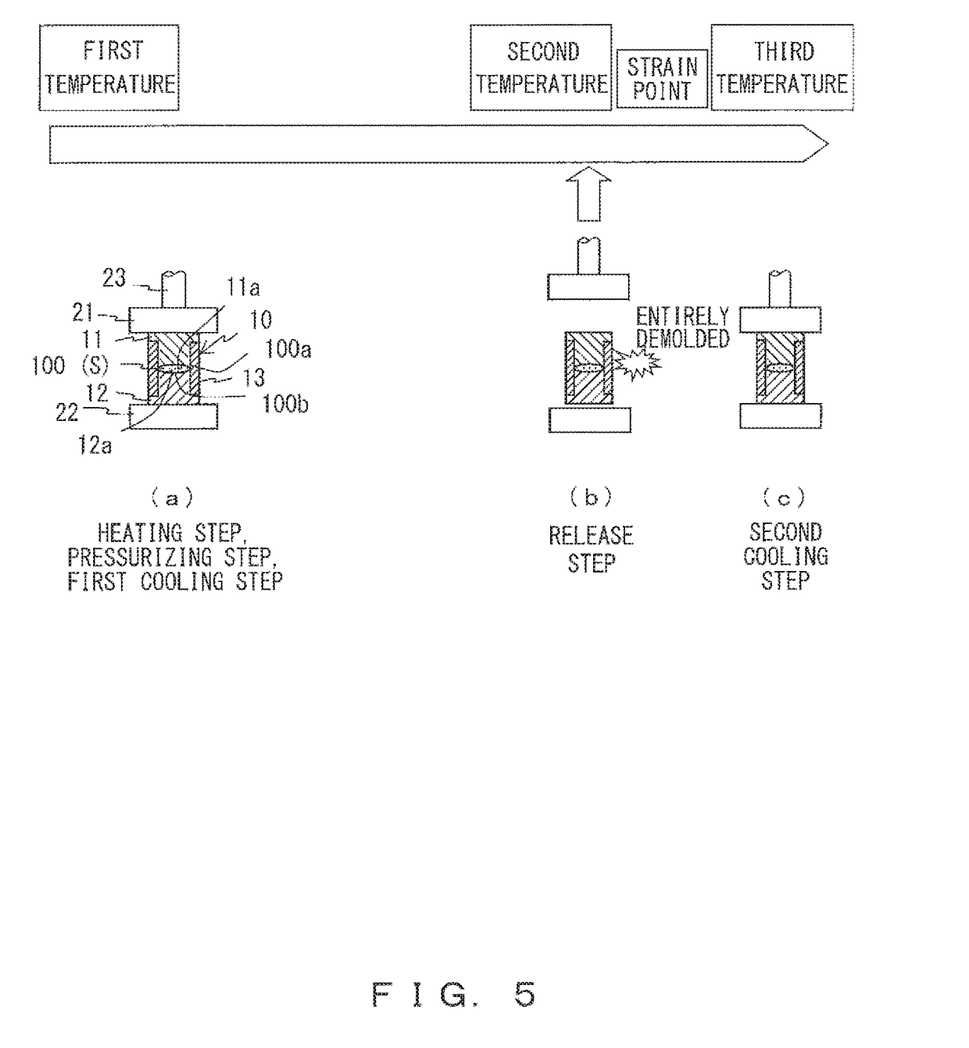
FIG. 5 is a diagram for explaining a method for manufacturing an optical element according to a second embodiment of the present invention.

FIG. 5 is a diagram for explaining a method for manufacturing an optical element according to the second embodiment.

As indicated in (a) of FIG. 5, after the heating step and the pressurizing step are performed as described above, the optical material 100 accommodated in the die set 10 is cooled down to a second temperature that is higher than a strain point and lower than a first temperature of the heating step while being pressurized by the upper die 11 and the lower die 12 with a predetermined load (the first cooling step).

Next, as indicated in (b) of FIG. 5, the pressurizing axis 23 moves up the first contact member 21 so as to release the predetermined load with which the optical material 100 is pressurized in the first cooling step described above (a release step). In this release step, the predetermined load is released at a set speed that is higher than or equal to a speed obtained in advance (for example, 90 [mm/sec] under condition 3 of FIG. 3), at which an elastic deformation occurs preferentially over a viscous deformation in the optical material 100 upon releasing a load. This results in demolding, for example, the entirety of the optical material 100 from at least one of the upper die 11 and the lower die 12.

Next, as indicated in (c) of FIG. 5, the pressurizing axis 23 moves down the first contact member 21 to bring it into contact with the upper surface of the upper die 11, and in the contacting state but, for example, without applying a load, the optical material 100 is cooled down to a third temperature that is lower than the above-described second temperature (the second cooling step). The third temperature in the second embodiment is lower than the strain point.

After that, a manufactured optical element is taken out from the die set 10.

In the second embodiment described above, in the release step, the above-described predetermined load is released at a set speed that is higher than or equal to a speed obtained in advance, at which an elastic deformation occurs preferentially over a viscous deformation in the optical material 100 upon releasing a load, as in the first embodiment described above. Thus, in the release step, the elastic strain of the optical material 100 is released at once, and the contractile force of the optical material 100 has to exceed the adhesion force to the upper die 11 and the lower die 12, so that the optical material 100 is demolded, for example, as a whole. Therefore, the second embodiment also makes it possible to control a demolding state of the optical material 100 so as to facilitate demolding of the optical material 100 easily.

Further, in the second embodiment, the predetermined load is released so as to demold the entirety of the optical material 100 from at least one of the upper die 11 and the lower die 12. This permits a sufficient form-transfer from the molding surfaces 11a and 12a of the upper die 11 and the lower die 12 to the optical material 100 until the optical material 100 is entirely demolded, so as to prevent the surface accuracy from being reduced.

Third Embodiment

A third embodiment of the present invention is mainly different from the first embodiment in that a predetermined load is released without demolding the periphery 100a of the optical material 100 from an upper die 31 and a lower die 32 in the release step, and in that the optical material 100 has a biconvex shape. Therefore, in the third embodiment, the descriptions of matters that overlap those of the first embodiment are omitted as appropriate, and the descriptions are focused on different matters.

Figure 6:
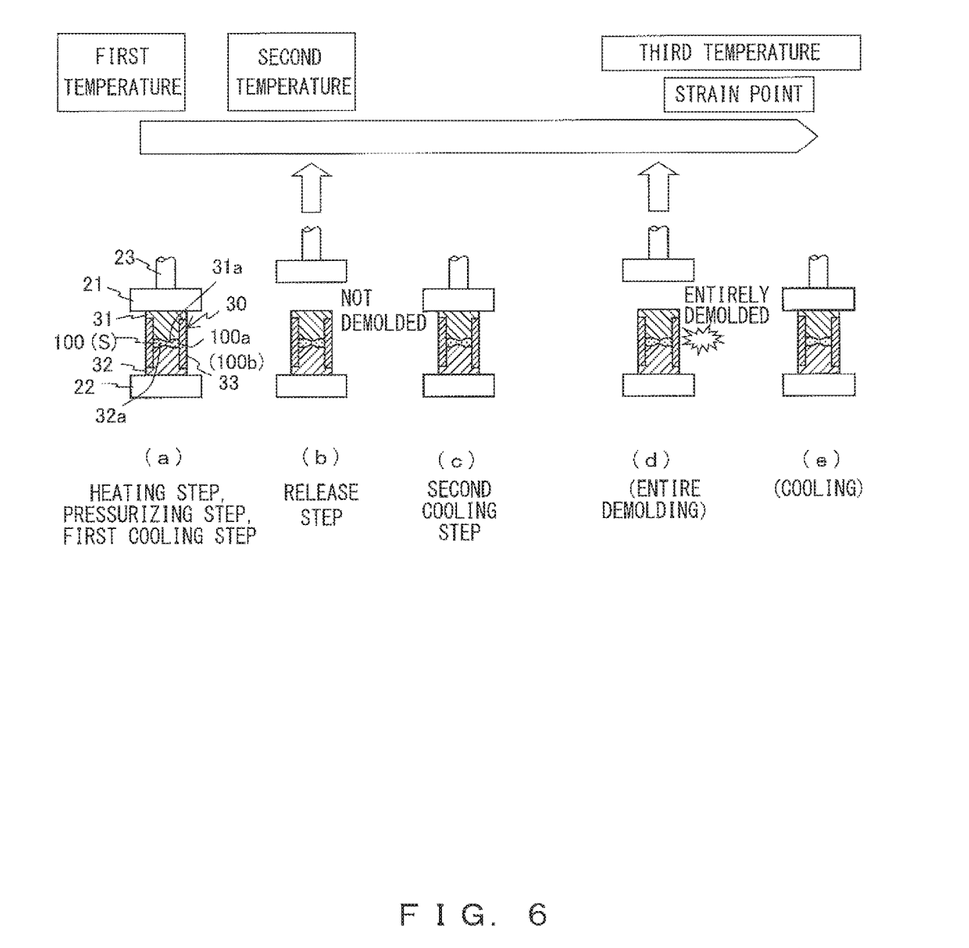
FIG. 6 is a diagram for explaining a method for manufacturing an optical element according to a third embodiment of the present invention.

FIG. 6 is a diagram for explaining a method for manufacturing an optical element according to the third embodiment.

A die set 30 illustrated in FIG. 6 includes the upper die 11 and the lower die 12 that are situated opposite to each other across the optical material 100, and a cylindrical body die 33 arranged around them. The upper die 31 and the lower die 32 are examples of the first mold and the second mold. The optical material 100 is, for example, glass, and an optical element manufactured through each step described later is, for example, a glass lens.

A convex molding surface 31a is formed on the bottom surface of the upper die 31. A convex molding surface 32a is formed on the top surface of the lower die 32. Thus, according to the third embodiment, a biconcave optical element in which the periphery 100a is the thickest portion 100b is manufactured. However, an optical element according to the third embodiment may have another shape having a thinnest portion that is a portion other than the periphery 100a, such as a concave shape on one side or a meniscus shape.

As indicated in (a) of FIG. 6, the optical material 100 accommodated in the die set 30 is heated by, for example, thermal conduction by the first contact member 21 and the second contact member 22 through the upper die 31 and the lower die 32 up to a first temperature that is higher than a transition point, so as to be softened (the heating step).

Next, the first contact member 21 is moved down by the pressurizing axis 23 so that the optical material 100 is pressurized by the upper die 31 and the lower die 32 (the pressurizing step).

Next, the optical material 100 is cooled down to a second temperature that is higher than a strain point and lower than the above-described first temperature while being pressurized by the upper die 31 and the lower die 32 with a predetermined load (the first cooling step).

Next, as indicated in (b) of FIG. 6, the pressurizing axis 23 moves up the first contact member 21 so as to release the predetermined load with which the optical material 100 is pressurized in the first cooling step described above (a release step). In this release step, the predetermined load is released at a set speed that is lower than or equal to a speed obtained in advance, at which a viscous deformation occurs preferentially over an elastic deformation in the optical material 100 upon releasing a load. This makes it possible to release the predetermined load without demolding the periphery 100a of the optical material 100 from the upper die 31 and the lower die 32.

In the third embodiment, the speed at which the demolding success rate is less than or equal to 10% is an example of the speed obtained in advance at which a viscous deformation occurs preferentially over an elastic deformation, and a speed that is lower than or equal to the above-described speed obtained in advance, such as the speed at which the demolding success rate is 0% (15 [mm/sec]) under condition 1 in FIGS. 2 and 3, can be used as the above-described set speed.

Here, the speed obtained in advance at which a viscous deformation occurs preferentially over an elastic deformation is a speed at which a repulsive deformation that broadens a space between the upper die 11 and the lower die 12 without demolding (arrows D21 and D22) occurs due to the optical material 100 flowing in a viscous manner, as illustrated in FIG. 4C described above.

In order to not demold the optical material 100 in the release step, a predetermined load just before the release may be less than 24 [N/mm²] because demolding may be facilitated if the predetermined load is greater than or equal to 24 [N/mm²] as in the first embodiment.

Further, demolding may be facilitated when a central axis of the upper die 31 is inclined with respect to a central axis of the lower die 32 by an angle between 0.7 to 1.5 arc minutes in the release step, as in the first embodiment, so the inclination may be eliminated or may be made smaller.

Next, as indicated in (c) of FIG. 6, the pressurizing axis 23 moves down the first contact member 21 to bring it into contact with the upper surface of the upper die 31, and in the contacting state, the optical material 100 is cooled down to a third temperature that is lower than the above-described second temperature (the second cooling step). The third temperature may be higher than or equal to the strain point, or lower than the strain point.

Next, as indicated in (d) of FIG. 6, the pressurizing axis 23 moves up the first contact member 21 so that, for example, the entirety of the optical material 100 is demolded from the upper die 31 and the lower die 32. Here, as long as it is possible to perform demolding, the speed at which the pressurizing axis 23 moves up the first contact member 21 does not have to be the set speed described in the first and the second embodiments, that is, a speed obtained in advance, at which an elastic deformation occurs preferentially over a viscous deformation.

Next, as indicated in (e) of FIG. 6, the pressurizing axis 23 may move down the first contact member 21 to bring it into contact with the upper die 31 so that the optical material 100 is further cooled in the contacting state but without applying a load.

After that, a manufactured optical element is taken out from the die set 30.

In the third embodiment described above, the method for manufacturing an optical element includes the heating step, the pressurizing step, the first cooling step, the release step, and the second cooling step. In the heating step, the optical material 100 is heated up to a first temperature that is higher than a transition point. In the pressurizing step, the optical material 100 is pressurized by the upper die 31 and the lower die 32 (examples of the first mold and the second mold) that are situated opposite to each other across the optical material 100. In the first cooling step, the optical material 100 is cooled down to a second temperature that is higher than a strain point and lower than the first temperature while being pressurized by the upper die 31 and the lower die 32 with a predetermined load. In the release step, the above-described predetermined load is released at a set speed that is lower than or equal to a speed obtained in advance, at which a viscous deformation occurs preferentially over an elastic deformation in the optical material 100 upon releasing a load. The optical material 100 is cooled down to a third temperature that is lower than the second temperature.

Thus, in the release step, the optical material 100 flows in a viscous manner due to the pressure being released slowly, and a repulsive deformation that broadens a space between the upper die 11 and the lower die 12 (arrows D21 and D22) occurs, as illustrated in FIG. 4C, which results in difficulty in demolding.

Therefore, the third embodiment permits a control of a demolding state of an optical element so as to prevent the optical material 100 from being demolded unintentionally.

Further, in the third embodiment, a predetermined load is released without demolding the periphery 100a of the optical material 100 from the upper die 31 and the lower die 32 in the release step. This results in being able to prevent the optical material 100 from being demolded unintentionally.

What is claimed is:

1. A method for manufacturing an optical element, comprising:
    heating an optical material up to a first temperature that is higher than a transition point;
    pressurizing the optical material using a first mold and a second mold that are situated opposite to each other across the optical material;
    first cooling the optical material down to a second temperature that is higher than a strain point and lower than the first temperature while pressurizing the optical material with a predetermined load using the first mold and the second mold;
    releasing the predetermined load at a set speed that is higher than or equal to a speed obtained in advance, at which an elastic deformation occurs preferentially over a viscous deformation in the optical material upon releasing a load; and
    second cooling the optical material down to a third temperature that is lower than the second temperature.

2. The method for manufacturing an optical element according to claim 1, wherein
    in the releasing, at least a portion of a periphery of the optical material is demolded from at least one of the first mold and the second mold by releasing the predetermined load.

3. The method for manufacturing an optical element according to claim 1, wherein a molding space formed by the first mold and the second mold molds an optical material having a thickest portion which has a thickness greater than or equal to 5.9 times the thickness of the periphery, and in the releasing, the predetermined load is released at a speed at which the release of the predetermined load is completed within 0.11 seconds.

4. The method for manufacturing an optical element according to claim 1, wherein in the releasing, the predetermined load just before the release is greater than or equal to 24 [N/mm$^2$].

5. The method for manufacturing an optical element according to claim 1, wherein in the releasing, a central axis of the first mold is inclined with respect to a central axis of the second mold by an angle between 0.7 to 1.5 arc minutes.

6. A method for manufacturing an optical element, comprising:

heating an optical material up to a first temperature that is higher than a transition point;

pressurizing the optical material using a first mold and a second mold that are situated opposite to each other across the optical material;

first cooling the optical material down to a second temperature that is higher than a strain point and lower than the first temperature while pressurizing the optical material with a predetermined load using the first mold and the second mold;

releasing the predetermined load at a set speed that is lower than or equal to a speed obtained in advance, at which a viscous deformation occurs preferentially over an elastic deformation in the optical material upon releasing a load; and second cooling the optical material down to a third temperature that is lower than the second temperature.

7. The method for manufacturing an optical element according to claim 6, wherein in the releasing, the predetermined load is released without demolding a periphery of the optical material from the first mold and the second mold.

* * * * *